(12) United States Patent
Gessner et al.

(10) Patent No.: US 6,629,022 B1
(45) Date of Patent: Sep. 30, 2003

(54) MOTOR VEHICLE CONTROL UNIT

(75) Inventors: Steffen Gessner, Regensburg (DE); Hans-Jurgen Reichi, Salching (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/762,605

(22) PCT Filed: Aug. 10, 1999

(86) PCT No.: PCT/DE99/02500
§ 371 (c)(1),
(2), (4) Date: Apr. 27, 2001

(87) PCT Pub. No.: WO00/10061
PCT Pub. Date: Feb. 24, 2000

(30) Foreign Application Priority Data

Aug. 10, 1998 (DE) .......................... 198 36 126

(51) Int. Cl.[7] ................................ G06F 7/00
(52) U.S. Cl. .............................. 701/1; 701/36
(58) Field of Search .............. 701/1, 29, 34, 701/35, 36; 340/425.5, 438, 500

(56) References Cited

U.S. PATENT DOCUMENTS

| | | | |
|---|---|---|---|
| 5,270,948 A | 12/1993 | O'Brien et al. | 364/550 |
| 5,328,278 A | 7/1994 | Kokubo | 400/74 |
| 5,638,270 A * | 6/1997 | Maeda et al. | 364/423.098 |
| 5,964,813 A * | 10/1999 | Ishii et al. | 701/35 |
| 6,243,627 B1 * | 6/2001 | Ozeki | 701/29 |

FOREIGN PATENT DOCUMENTS

| | | |
|---|---|---|
| DE | 2 125 578 A | 3/1984 |
| EP | 0 658 830 A1 | 6/1995 |

* cited by examiner

Primary Examiner—Yonel Beaulieu

(57) ABSTRACT

A control unit has a microprocessor, a non-volatile program memory, a volatile or erasable non-volatile monitoring result memory and a non-volatile, writable backup memory. The program memory stores both a control program routine and a monitoring program routine for monitoring the controlled system. An obtained monitoring result is stored in the monitoring result memory and is transferred to the backup memory.

10 Claims, 2 Drawing Sheets

FIG. 2

Figure 1:
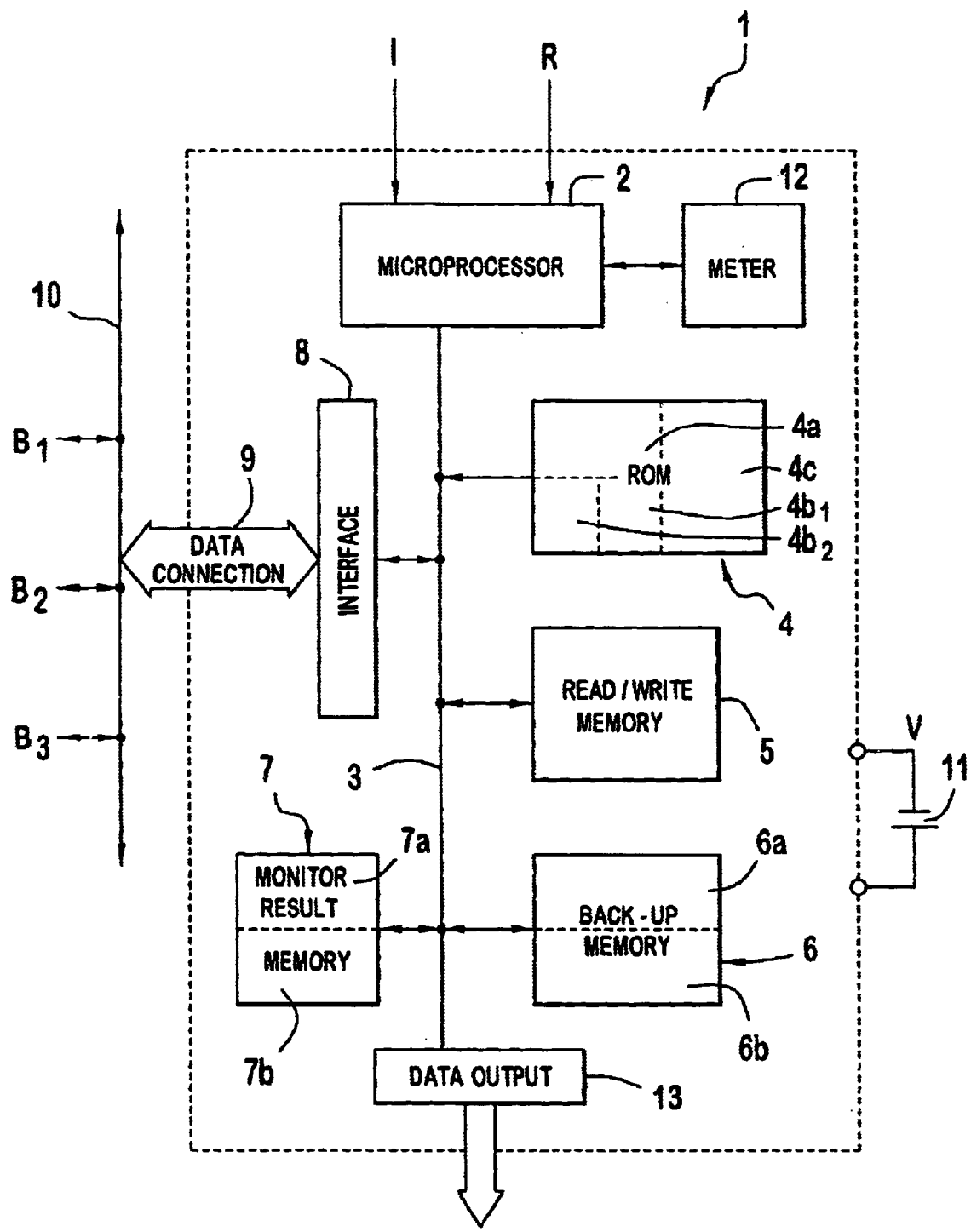

|  $F_i$ | $t_i$ |  |  |
|---|---|---|---|
|  |  |  |  |
|  |  |  |  |
|  |  |  |  |
|  |  |  |  |
|  |  |  |  |
|  |  |  |  |
| $F_1$ | $t_1$ |  |  |
| $F_2$ | $t_2$ |  |  |
| $F_3$ | $t_3$ |  |  |
| $F_4$ | $t_4$ |  |  |

$(F_n, t_n)$ 6a     6b

MOTOR VEHICLE CONTROL UNIT

The invention relates to a control unit, in particular a motor vehicle control unit in accordance with the precharacterizing clause of claim 1. In addition, the invention relates to a method for operating such a control unit in accordance with claim 10.

A control unit formed in accordance with the precharacterizing clause of claim 1 is already known.

It is also already known practice to design such control units such that they perform not only their actual control task but also monitoring functions for the controlled system. The program memory of a known motor vehicle control unit contains error diagnosis routines which are used to regularly check that a number of modules or components of the motor vehicle (for example sensors or actuators) are operating correctly. The test data obtained in this process are supplied to the motor vehicle control unit and are assessed there by the microprocessor (under the control of the error diagnosis routine) with regard to the occurrence of a fault in the module being monitored. If a fault is established, the microprocessor ascertains an error diagnosis result which, by way of example, indicates the type, form and instant of detection of the error. This error diagnosis result is stored in a volatile or erasable non-volatile error memory (monitoring result memory) provided for this purpose in the motor vehicle control unit. In addition, the occurrence of the fault can be notified to the driver by a warning device or the like. The motor vehicle is then taken to a workshop for repair on the basis of the warning or as part of regular servicing. In the workshop, the error memory of the motor vehicle control unit is first read by a suitable communication unit. The error diagnosis result then obtained can generally be used to ascertain the cause of the fault which has occurred or at least to narrow it down.

After a repair attempt, the error memory is reset in order to be able to establish whether the error occurs again. If this is not the case, repair has been successful. If repair is unsuccessful a number of times, i.e. the error diagnosis result occurs again, the control unit is usually sent to the manufacturer for checking with an indication of the error diagnosis result. The manufacturer checks the serviceability of the motor vehicle control unit. It is not able to reconstruct the "error history", however, since the error memory has been erased. The manufacturer is therefore not able to check the workshop's details regarding the error or, when there is no information, to itself ascertain the error origination history.

Besides the aforementioned possibility of error checking by implementing an error diagnosis routine in a motor vehicle control unit, it is also already known practice to make such control units "capable of learning". This is based on the control unit being delivered from the factory with fixed preset values which, however, are not able to make allowance for unavoidable component tolerances and changes to the components over their lifetime (in particular the effects of aging). Furthermore, changing environmental influences may become noticeable in operation and may result in the control parameters used not giving an optimum operating response. An adaptation routine provided in the program memory of the control unit at the factory is therefore used to regularly match the preset values and the control parameters to the actual circumstances, which means that original manufacturing tolerances and wear and tear can be allowed for and any change in the operating response on account of changing external environmental influences can be compensated for using control technology.

When the motor vehicle control unit is sent to the manufacturer for repair, the adaptively changed preset values and control parameters are also lost. These values are likewise of interest when searching for an error or when reconstructing the "error origination history", since the discrepancies in adaptively changed values and standard values can be used to ascertain "anomalies" in the operating response of a module.

The invention is based on the object of providing a control unit which makes it possible to reduce costs which arise when the control unit needs to be checked at the factory. In addition, the invention aims to reduce the costs which arise when the control unit is sent to the manufacturer.

The object on which the invention is based is achieved by the features of claims 1 and 10.

The non-volatile, writable backup memory provides a storage medium in which a loss of data occurs neither when the control unit is isolated from an operating voltage supplying the control unit with power nor if the monitoring result memory is intentionally erased, for example by the workshop. The monitoring results (an individual monitoring result may also be involved) previously transferred to the non-volatile backup memory can thus be reconstructed by reading the non-volatile backup memory once the control unit has been sent to the manufacturer. Since the monitoring results contain information regarding the "error history" of the controlled system, the manufacturer now no longer has to rely on the details from the workshop in this regard. This allows it to assess the error situation simply and objectively also with regard to any rights to compensation for the workshop or for the customer.

The monitoring program routine is preferably an error diagnosis routine, with a monitoring result representing a detected error in the controlled system. As an alternative to this, the monitoring program routine may also be an adaptation routine, with a monitoring result representing a preset value and/or a control parameter used in operation by the control unit. The monitoring program routine may thus comprise both an error diagnosis routine and an adaptation routine.

Usually, a plurality of monitoring program routines are provided. This is advantageous particularly if the control unit according to the invention is controlling a system, in particular a motor vehicle, comprising a plurality of distributed modules in the manner of a central control unit, since it then becomes possible to monitor (error diagnosis/adaptation control) each individual module.

Preferably, the monitoring result stored in the monitoring result memory is in each case transferred to the non-volatile backup memory at the end of an operating cycle of the control unit. Alternatively, the monitoring result can be transferred from the monitoring result memory to the non-volatile backup memory during the operating cycle.

The non-volatile backup memory can comprise a prescribed number of N memory areas, and a current monitoring result can be transferred (possibly in part) from the monitoring result memory to the non-volatile backup memory such that if the non-volatile backup memory already holds an older monitoring result which corresponds to the current monitoring result, this older monitoring result is replaced by the current monitoring result, or that if the non-volatile backup memory holds no previously stored monitoring result which corresponds to the current monitoring result, the current monitoring result is entered into a free memory area of the non-volatile backup memory. If there is no longer any such free memory area, the oldest monitoring result stored in the non-volatile backup memory is replaced by the current monitoring result. This ensures that current monitoring results are always stored in the non-volatile backup memory, while older monitoring results can be discarded in accordance with the principle of a FIFO register only if the backup memory is filled entirely.

Further advantageous refinements of the invention are specified in the dependent claims.

The invention is described below with the aid of a single illustrative embodiment with reference to the drawing, in which:

FIG. 1 shows a schematic circuit block diagram of an illustrative embodiment of the invention; and FIG. 2 shows a schematic illustration of the memory areas available in the (non-volatile) backup memory with entered error results.

A motor vehicle control unit 1 has a microprocessor 2 which has a data connection via an address/data/control bus 3 to a read-only memory (ROM) 4, to a read/write memory (RAM) 5 and to a non-volatile memory (EEPROM) 6 and also to a volatile or erasable, non-volatile monitoring result memory 7. The address/data/control bus 3 of the motor vehicle control unit 1 is coupled to a unit-internal interface 8 which is connected via a bidirectional data connection 9 to a central data bus 10 of a motor vehicle (not shown).

The central data bus 10 is connected to a series of modules B1, B2, B3 in the motor vehicle such that it can interchange data with them, and the motor vehicle control unit 1 both controls and monitors the individual modules B1, B2, B3, as explained in more detail below. The modules B1, B2, B3 may be a sensor, an actuator and an automatic transmission, for example.

In addition, the motor vehicle control unit 1 is provided with a service hour meter 12 which is connected to the microprocessor 2 via a bidirectional data line.

When installed, the motor vehicle control unit 1 is supplied with an operating voltage V from a vehicle electrical system 11 in the motor vehicle, which is also available to the motor vehicle control unit 1 when the ignition is turned off (i.e. outside an operating cycle).

The motor vehicle control unit 1 controls the modules B1, B2, B3 in a manner which is known per se. For this purpose, a memory section 4a of the read-only memory 4 has a control program implemented in it which usually comprises a multiplicity of control program routines S1, S2, S3 for the individual modules B1, B2, B3. Since the read-only memory (ROM) 4 is a non-volatile memory, the data for the control program are not lost in the event of failure of the power supply by the vehicle electrical system 11.

The control sequence of the motor vehicle control unit 1 is as follows:

At the start of an operating cycle, the control unit 1 is notified of the motor vehicle ignition being turned on via an ignition signal line I. The service hour meter 12 is then triggered. Next, the control program (or the individual control program routines S1, S2, S3) is loaded into the read/write memory 5 from the read-only memory section 4a and is executed by the microprocessor 2. Part of the control program may first involve initializing the individual modules B1, B2, B3. During the actual control sequence of the modules B1, B2, B3, the motor vehicle control unit 1 receives via the central data bus 10 and the bidirectional data connection 9 measurement data which are output by sensors (not shown) or by the modules B1, B2, B3 themselves. The individual modules B1, B2, B3 are then controlled in the usual manner, i.e. the measurement data received are compared with table data stored at a suitable point in the motor vehicle control unit 1, and the microprocessor 2 then calculates control data which are supplied to the associated module B1, B2, B3 via the interface 8, the bidirectional data line 9 and the central data bus 10 and change the operating response of the appropriate module B1, B2, B3 as desired in the manner of feedback.

In addition to the control mode, the motor vehicle control unit 1 executes an error diagnosis mode and a preset value/control parameter adaptation mode. For this purpose, the read-only memory section $4b1$ stores error diagnosis routines U1, U2, U3 and the read-only memory section $4b2$ stores adaptation routines A1, A2, A3.

As part of the error diagnosis mode, test data (raw data) suitable for error checking are retrieved from the individual modules B1, B2, B3. The test data are in turn supplied to the microprocessor 2 via the bidirectional data connection 9, the interface 8 and the address/data/control bus 3. In this context, the data polling frequency is dependent on the individual modules B1, B2, B3 and may be very diverse. Whereas, for example, data are polled continuously (for example every 10 ms) for the module B1 (e.g. sensor), it may be sufficient to poll test data less frequently in the case of other modules (for example B2 and B3). Depending on the module B1, B2, B3 under consideration, it may be sufficient to retrieve the test data only once during an operating cycle, and provision may also be made for test data to be retrieved only if a prescribed condition is satisfied, for example if the cooling water temperature has exceeded a prescribed value.

The way in which the motor vehicle control unit 1 operates in the event of a fault is explained for the instance of an error occurring in the module B1.

When the error diagnosis routine U1 (stored in the read-only memory section $4b1$) associated with the module B1 is executed, test data situated outside a prescribed associated tolerance interval are obtained from the module B1. The microprocessor 2 then records the occurrence of an error in B1 and uses the service hour meter 12 to ascertain the current operating time. The microprocessor 2 then generates an error result and supplies this result to the memory section 7a of the monitoring result memory 7 via the address/data/control bus 3. The memory section 7a is also called error result memory below. The error result calculated by the microprocessor 2 comprises an error statement F, which specifies the type and/or the form of the error, and the current operating time t, i.e. the error detection time. If, as in the present example, a plurality of modules B1, B2, B3 are being monitored using associated error diagnosis routines U1, U2, U3, the error statement F additionally comprises an information item denoting the faulty module.

At the end of an operating cycle, i.e. when the motor vehicle ignition is turned off (which is notified via the ignition signal line I), a backup copy of the content or of a part of the content of the error result memory 7a is made, in accordance with the invention, in the (non-volatile) backup memory 6. In this context, all the error results (F, t) obtained during the elapsed operating cycle are backed up in a section 6a of the backup memory 6.

The backup sequence is explained with the aid of FIG. 2. Since the backup memory 6 may also comprise solely the section 6a, it is called backup memory 6a below for the sake of simplicity. The N memory areas (memory locations) of the backup memory 6a which are provided for error result storage are shown in the left-hand half of FIG. 2. By way of example, the backup memory 6a can store a maximum of ten (i.e. N=10) error results. As already mentioned, each error result in this context comprises an error statement $F_i$, $i=1$ to 10, and an error detection time $t_i$, $i=1$ to 10.

It is assumed that four error results (F1, t1), ..., (F4, t4) are already stored in the backup memory 6a before the end of an operating cycle. If an error occurred during the elapsed operating cycle, this is present in the error result memory 7a in the form of an error result (Fn, tn). The content of the backup memory 6a is then updated as follows: if the same error has already occurred in an earlier operating cycle, the error statement Fn matches one of the error statements F1, F2, F3 or F4. In this case, the error result (Fn, tn) is not added to the backup memory 6a as a new error, but instead the error result already entered is updated with the new error detection time tn. This applies both to errors which repeatedly occur during successive operating cycles and to errors which occur only sporadically over successive operating cycles, i.e. appear to have already been "remedied" in the meantime.

The described manner in which errors are transferred from the error result memory 7a to the backup memory 6a results in only different error results (and never identical errors which have occurred at different times) being entered in the backup memory 6a.

Provision may be made for the error results stored in the error result memory 7a to be automatically erased after a prescribed time. Error results erased in this manner can no longer be reconstructed, even in the workshop. By contrast, the error results backed up in the backup memory 6a are generally not erased. Only in the event of more than ten (different) errors being detected are the error results with the least significant detection time pushed out of the backup memory 6a in order to make room for the newly obtained, current error results. An appropriately large memory capacity N in the backup memory 6a permits the loss of error results to be virtually precluded, however.

The backup memory 6a thus contains a history of all detected errors with error statements F and updated error detection instants t.

In a repair workshop, the motor vehicle control unit 1 is connected via a data output 13 to a diagnosis unit (not shown in FIG. 1). The diagnosis unit reads out the error results stored in the error result memory 7a. Using the read error results, an attempt is made to repair the faulty module B1, as already described The memory content of the error result memory 7a is then erased by inputting a reset signal R, the error diagnosis routine is carried out again and the content of the error result memory 7a is then examined to determine whether the error has occurred again after the diagnosis check has taken place or has been completed.

The backup memory 6a of the non-volatile memory (EEPROM) 6 is not affected by the erasure operation, i.e. the "error history" ((Fn, tn), (F4, t4), ..., (F1, t1)) stored in it is retained.

If the motor vehicle control unit 1 needs to be sent back to the manufacturer because the error could not be eliminated by repair, the motor vehicle control unit 1 needs to be isolated from the vehicle electrical system 11. The content of the error result memory 7a is consequently lost. The error results ((Fn, tn), (F4, t4), ..., (F1, t1)) backed up in the backup memory 6a still allow the manufacturer to reconstruct the error history. To this end, the motor vehicle control unit 1 is connected to a reading unit available to the manufacturer via the data output 13 and the memory content of the (non-volatile) backup memory 6a is read out.

A further area of application for the invention relates to the backing up of adaptively matched preset values or control parameters. Preset values and control parameters are stored in a memory section 4c of the read-only memory 4 at the factory and are used by the control program routines S1, S2, S3 on initial startup or after the vehicle electrical system 11 has failed. The preset values make no allowance for component tolerances and aging phenomena in the individual modules B1, B2, B3. In addition, the stipulation of fixed control parameters cannot take sufficient account of changing environmental influences, such as temperature fluctuations and air pressure fluctuations. To make an optimum operating response from the individual modules B1, B2, B3 constantly possible despite the aforementioned effects, the adaptation routines A1, A2, A3 stored in the read-only memory section 4b2 are provided. The adaptation routines A1, A2, A3, like the error diagnosis routine U1, U2, U3, are continuously, or else just occasionally retrieved by the microprocessor 2. In this context, a dedicated adaptation routine A1, A2, A3 may be provided for each individual module B1, B2, B3.

As part of the adaptation monitoring, operating data (raw data) entering via the bidirectional data connection 9 and the interface 8 are processed by the microprocessor 2 under the control of the adaptation routines A1, A2, A3. In this context, the microprocessor 2 ascertains adapted preset values and adapted control parameters, which permit more optimum control of the respective module B1, B2, B3 under the prevailing environmental conditions. The adapted preset values and adapted control parameters are stored in a memory section 7b of the monitoring result memory 7—which is also called adaptation value memory 7b below—and are renewed regularly.

So long as the motor vehicle control unit 1 is connected to the vehicle electrical system 11 in the motor vehicle, the memory content of the adaptation value memory 7b is retained. During an operating cycle, the control program (i.e. the control program routines S1, S2, S3) uses these values/parameters.

In the event of the vehicle electrical system 11 failing (i.e. V=0), the content of the adaptation value memory 7b is lost. To permit the adapted preset values and control parameters to be still reconstructed later, the section 6b of the non-volatile memory (EEPROM) 6 is provided. This is called backup memory 6b below. In principle, the adapted preset values and/or the adapted control parameters are transferred (backed up) to the backup memory 6b in a similar manner to the error results being transferred from the error result memory 7a to the backup memory 6a as already described. Transfer can thus take place, for example, in each case at the end of an operating cycle in the form of an update to the content of the backup memory 6b.

When the motor vehicle control unit 1 is being checked by the manufacturer, the manufacturer can now also recover the adapted preset values and the adapted control parameters. These variables permit statements to be made about changes or "anomalies" which have arisen on the motor vehicle and which, together with the error results, can provide significant information about the vehicle condition, i.e. the condition of the individual modules B1, B2, B3 that are monitored.

In addition to the backing up of error results (in the backup memory 6a) and/or preset values and also possibly control parameters (in the backup memory 6b) which is described here, the backup memory 6 may also store other values which need to be available by reading in the aforementioned manner after the motor vehicle control unit 1 has been isolated from the vehicle electrical system 11.

What is claimed is:

1. A motor vehicle control unit, having a microprocessor, having a non-volatile program memory storing at least one control program routine for controlling a system which is connected to the control unit and at least one monitoring program routine for continuously or occasionally monitoring the system, and having a volatile or erasable non-volatile monitoring result memory storing one or more monitoring results ((Fi, ti), i=1, 2. . . ) calculated from monitoring data, obtained from the system, by means of the microprocessor when passing through the monitoring program routine, characterized in that the control unit also contains a non-volatile, writable backup memory, and in that the calculated monitoring results or a part thereof ((F1, t1), . . . , (F4, t4)) can be transferred to the non-volatile, writable backup memory.

2. The control unit as claimed in claim 1, characterized in that the monitoring program routine is an error diagnosis routine, and in that a monitoring result ((Fi, ti), i=1, 2 . . . ) represents a detected error in the controlled system.

3. The control unit as claimed in claim 1, characterized in that the monitoring program routine is an adaptation routine, and in that a monitoring result represents an adaptively matched preset value and/or an adaptively matched control parameter used in operation by the control unit.

4. The control unit as claimed in claim 1, characterized in that the monitoring program routine comprises both an error diagnosis routine and an adaptation routine.

5. The control unit as claimed in claim 1, characterized in that the controlled system comprises a plurality of controlled modules.

6. The control unit as claimed in claim 1, characterized in that a monitoring result ((Fi, ti), i=1, 2 . . . ) stored in the volatile or erasable non-volatile monitoring result memory is in each case transferred to the non-volatile backup memory at the end of an operating cycle of the control unit.

7. The control unit as claimed in claim 1, characterized in that the non-volatile backup memory comprises a prescribed number of N memory areas, and a current monitoring result (Fn, tn) is transferred from the monitoring result memory to the non-volatile backup memory such that if the non-volatile backup memory already holds an older monitoring result which corresponds to the current monitoring result (Fn, tn), this older monitoring result is replaced by the current monitoring result (Fn, tn), or that if the non-volatile backup memory holds no previously stored monitoring result which corresponds to the current monitoring result (Fn, tn), the current monitoring result (Fn, tn) is entered into a free memory area of the non-volatile backup memory, or, if there is no longer any such memory area, the oldest monitoring result stored in the non-volatile backup memory is replaced by the current monitoring result (Fn, tn).

8. The control unit as claimed in claim 1, characterized in that a monitoring result is entered in the non-volatile backup memory in the form of a monitoring result data record ((Fi, ti), i=1, 2 . . . ) which contains an error statement (Fi) characterizing the monitoring result as an error type and/or error form and/or faulty module of the system, and a time information item (ti) representing the instant of detection of the monitoring result.

9. The control unit as claimed in claim 1, characterized in that the control unit comprises a data output which can be used to read out the monitoring results ((Fn, tn), (F4, t4), . . . , (F1, t1)) stored in the non-volatile backup memory.

10. A method for operating a control unit designed in accordance with claim 1, in which the control unit is isolated from the system which is to be controlled and from an external operating voltage source;

the control unit is transported to another location; and the monitoring results ((Fn, tn), (F4, t4), . . . , (F1, t1)) stored in the non-volatile backup memory of the control unit are read out by means of a reading device which is available there.

* * * * *